US012811158B2

(12) United States Patent
Jang et al.

(10) Patent No.: US 12,811,158 B2
(45) Date of Patent: Nov. 24, 2026

(54) NEGATIVE ELECTRODE FOR LITHIUM SECONDARY BATTERY AND METHOD FOR MANUFACTURING THE SAME

(71) Applicant: LG ENERGY SOLUTION, LTD., Seoul (KR)

(72) Inventors: Yeong Cheol Jang, Daejeon (KR); Sang Jin Seo, Daejeon (KR); Jea Bong Jung, Daejeon (KR); Chang Bum Ahn, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 726 days.

(21) Appl. No.: 18/028,447

(22) PCT Filed: Aug. 5, 2022

(86) PCT No.: PCT/KR2022/011673
§ 371 (c)(1),
(2) Date: Mar. 24, 2023

(87) PCT Pub. No.: WO2023/018118
PCT Pub. Date: Feb. 16, 2023

(65) Prior Publication Data
US 2023/0335750 A1 Oct. 19, 2023

(30) Foreign Application Priority Data
Aug. 12, 2021 (KR) ........................ 10-2021-0106413

(51) Int. Cl.
*H01M 4/66* (2006.01)
*H01M 4/04* (2006.01)
*H01M 4/02* (2006.01)

(52) U.S. Cl.
CPC ......... *H01M 4/667* (2013.01); *H01M 4/0404* (2013.01); *H01M 4/661* (2013.01); *H01M 2004/027* (2013.01)

(58) Field of Classification Search
CPC ..... H01M 4/667; H01M 4/0404; H01M 4/661
See application file for complete search history.

(56) References Cited

U.S. PATENT DOCUMENTS

2009/0098457 A1 4/2009 Kwon et al.
2012/0040241 A1 2/2012 Kim et al.
(Continued)

FOREIGN PATENT DOCUMENTS

CN 102376959 A 3/2012
EP 4 191 699 A1 6/2023
(Continued)

OTHER PUBLICATIONS

JP_2012094342_A_H Translation (Year: 2012).*
(Continued)

*Primary Examiner* — Jimmy Vo
(74) *Attorney, Agent, or Firm* — Birch, Stewart, Kolasch & Birch, LLP

(57) ABSTRACT

A negative electrode for a lithium secondary battery and a method of manufacturing the negative electrode including a negative electrode current collector and a negative electrode mixture layer on at least one surface of the current collector. The negative electrode is manufactured by controlling a static water contact angle of a surface of a negative electrode current collector and an contact angle formed by an end portion of a negative electrode mixture layer and the negative electrode current collector, within a specific range by treating the surface of the negative electrode current collector with atmospheric pressure plasma. The adhesion between the negative electrode current collector and the
(Continued)

negative electrode mixture layer may be improved, and the induction of a reversal of an N/P ratio between a positive electrode and a negative electrode in an electrode assembly and the occurrence of unrolling in the negative electrode mixture layer may be prevented.

2 Claims, 2 Drawing Sheets

(56) References Cited

U.S. PATENT DOCUMENTS

| | | | |
|---|---|---|---|
| 2013/0004855 A1 | 1/2013 | Yamazaki et al. | |
| 2014/0150947 A1* | 6/2014 | Shannon | C08J 7/0427 156/123 |
| 2014/0170490 A1 | 6/2014 | Izuhara et al. | |
| 2017/0005339 A1 | 1/2017 | Kim et al. | |
| 2019/0237758 A1 | 8/2019 | Dadheech et al. | |

FOREIGN PATENT DOCUMENTS

| | | | | | |
|---|---|---|---|---|---|
| JP | 2010-9980 | A | | 1/2010 | |
| JP | 2012-38700 | A | | 2/2012 | |
| JP | 2012-94342 | A | | 5/2012 | |
| JP | 2012094342 | A | * | 5/2012 | |
| JP | 6726780 | B1 | | 7/2020 | |
| JP | 2020-145002 | A | | 9/2020 | |
| KR | 10-2009-0038309 | A | | 4/2009 | |
| KR | 10-1008750 | B1 | | 1/2011 | |
| KR | 10-2012-0136396 | A | | 12/2012 | |
| KR | 10-2013-0060527 | A | | 6/2013 | |
| KR | 10-2015-0027022 | A | | 3/2015 | |
| KR | 10-2016-0033482 | A | | 3/2016 | |
| KR | 10-2017-0034773 | A | | 3/2017 | |
| KR | 10-2018-0036249 | A | | 4/2018 | |
| KR | 20180036249 | A | * | 4/2018 | H01M 4/139 |
| KR | 10-2076689 | B1 | | 2/2020 | |
| WO | WO-2011114473 | A1 | * | 9/2011 | H01M 4/04 |
| WO | WO 2014/050846 | A1 | | 4/2014 | |
| WO | WO 2020/179183 | A1 | | 9/2020 | |

OTHER PUBLICATIONS

WO_2011114473_A1 Translation (Year: 2011).*

R_20180036249_A_H Translation (Year: 2018).*

Chinese Office Action and Search Report for Chinese Application No. 202280006715.0, dated Jul. 28, 2025, with English translation.

Extended European Search Report for European Application No. 22856117.1, dated Nov. 5, 2024.

Tseng et al., "Dielectric-Barrier-Discharge Jet Treated Flexible Supercapacitors with Carbon Cloth Current Collectors of Long-Lasting Hydrophilicity," Journal of the Electrochemical Society, vol. 167, 116511, 2020, 10 pages total.

Japanese Office Action for Japanese Application No. 2023-520511, dated May 20, 2024, with an English translation.

International Search Report for PCT/KR2022/011673 mailed on Nov. 28, 2022.

European Communication pursuant to Article 94(3) EPC for European Application No. 22856117.1, dated Nov. 26, 2025.

* cited by examiner

【Fig.1】
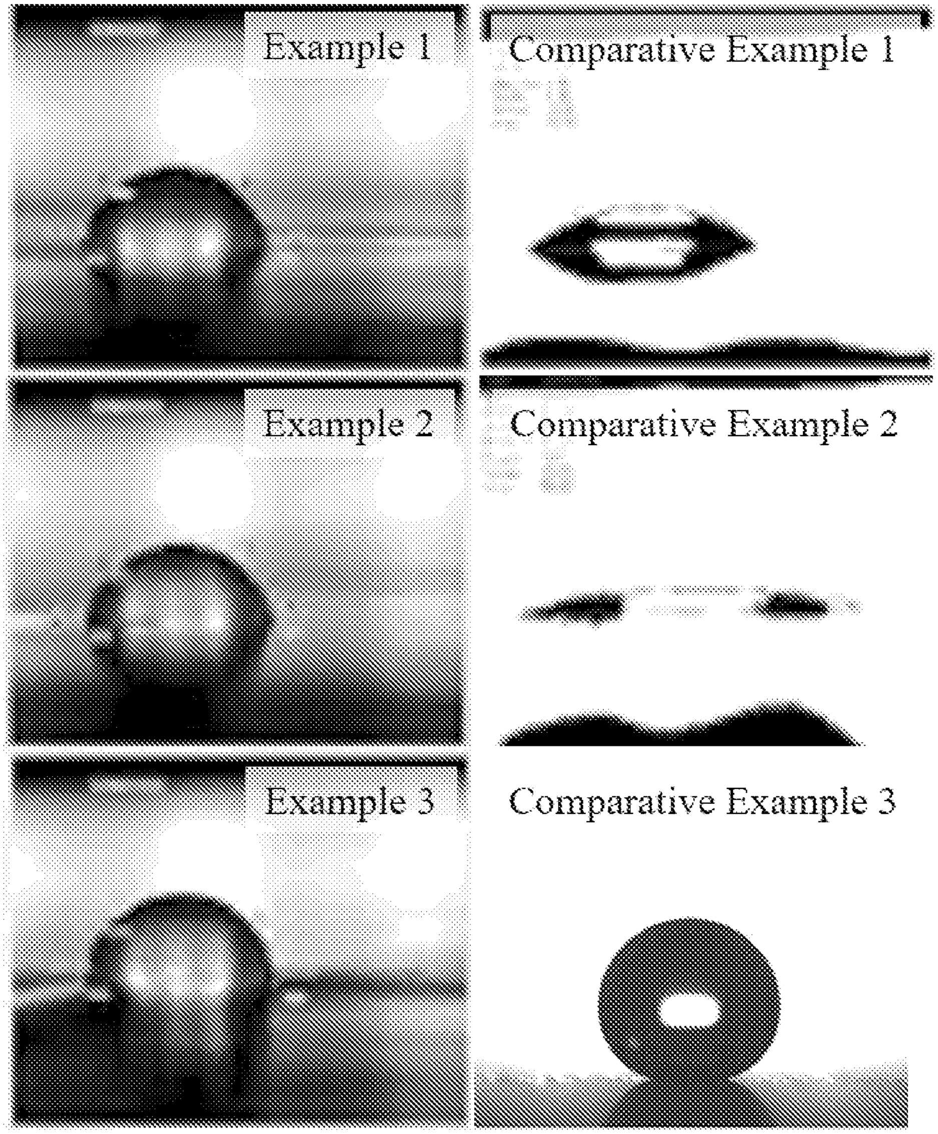

【Fig.2】
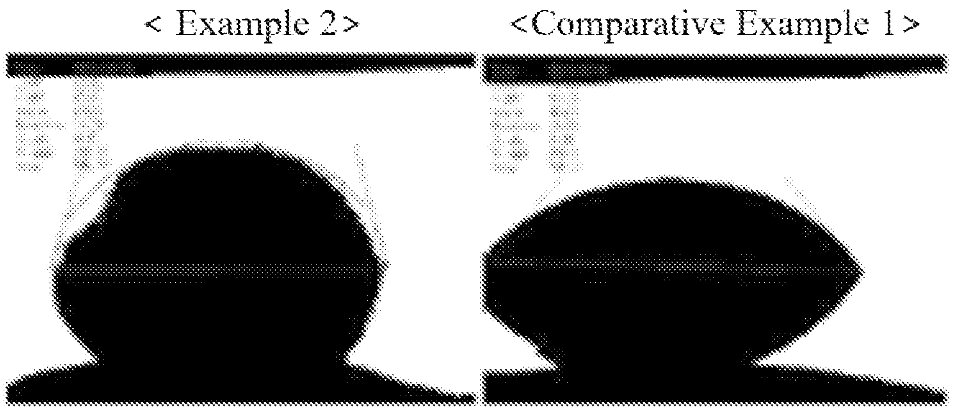

NEGATIVE ELECTRODE FOR LITHIUM SECONDARY BATTERY AND METHOD FOR MANUFACTURING THE SAME

TECHNICAL FIELD

The present invention relates to a negative electrode for a lithium secondary battery and a method of manufacturing the same.

This application claims the benefit of priority based on Korean Patent Application No. 10-2021-0106413, filed on Aug. 12, 2021, and the entire contents of the Korean patent application are incorporated herein by reference.

BACKGROUND ART

A lithium secondary battery acts as a battery while repeating intercalation and deintercalation of lithium ions in a positive electrode and a negative electrode. Between these electrodes, a lithium salt-containing electrolyte in which the lithium ions move but electrons cannot move, and a separator that separates the positive electrode and the negative electrode so that the positive electrode and the negative electrode do not come into contact to prevent a short-circuit between the electrodes due to the contact are provided.

In the lithium secondary battery, many studies have been conducted in terms of high capacity and high density, and recently, various studies have been conducted to improve lifespan and safety. Specifically, an electrode used in the lithium secondary battery is generally manufactured by coating an electrode slurry to a predetermined thickness on a current collector and drying the coated electrode to form a mixture layer, and the mixture layer thus formed changes to a solid phase while a liquid binder solvent is dried to a gas phase when the slurry is dried and is present as a solid binder between particles and between the current collector and the particles to have an adhesive force. In this case, when the adhesion between the particles and the current collector is reduced, an electron conduction rate is reduced due to resistance to the movement of electrons from the particles to the current collector, and thus, there is a problem in that charge/discharge rate characteristics and cycle characteristics of the battery are degraded. In addition, there is also a limit in that safety is reduced because the current collector and the mixture layer are easily separated when an external force is applied to the battery.

In order to improve such a problem, a technique of increasing a binder content of the mixture layer to improve the adhesion between an electrode mixture layer and the current collector or forming a primer layer to modify a surface structure of the current collector or to improve adhesion has been developed. However, when the binder content of the electrode mixture layer is increased, there is a limit in that battery performance is reduced because the content of an electrode active material and a conductive material in the mixture layer is relatively reduced to increase electrode resistance and reduce conductivity. In addition, when the surface structure of the current collector is modified or the primer layer is formed, safety problems such as internal short-circuit and waste of battery capacity may occur because, when the electrode is a negative electrode, a contact angle formed by an end portion of the negative electrode mixture layer and the current collector is reduced and thus an N/P ratio between the positive electrode and the negative electrode may be reversed. Accordingly, there is a need to develop a technique capable of improving both the safety and performance of the battery by increasing the adhesion between the electrode mixture layer and the current collector.

RELATED-ART DOCUMENT

Patent Document

Korean Patent Application Publication No. 10-2016-0033482.

DISCLOSURE

Technical Problem

Accordingly, an object of the present invention is to provide an electrode, particularly, a negative electrode for a lithium secondary battery, capable of improving the adhesion between an electrode mixture layer and an electrode current collector while improving the safety or performance degradation of a battery, which is caused by the reversal of an N/P ratio between a positive electrode and a negative electrode.

Technical Solution

In order to solve the above-described problem, one embodiment of the present invention provides a negative electrode for a lithium secondary battery including a negative electrode current collector, and a negative electrode mixture layer on at least one surface of the negative electrode current collector where the negative electrode mixture layer includes a negative electrode active material, wherein the negative electrode current collector has a static water contact angle of 60° to 100°.

In this case, the at least one surface of the negative electrode current collector may be surface-treated with an alkyl group having 1 to 6 carbon atoms.

Further, an angle formed by an end portion of the negative electrode mixture layer and the negative electrode current collector may be 60° or more, and in the negative electrode, the peel strength of the negative electrode mixture layer with respect to the negative electrode current collector according to ASTM D903 may be in a range of 10 gf/cm to 50 gf/cm.

Further, one embodiment of the present invention provides a method of manufacturing the negative electrode for a lithium secondary battery, the method including: surface-treating a negative electrode current collector with atmospheric pressure plasma; and forming a negative electrode mixture layer by applying and drying a slurry including a negative electrode active material on at least one surface of the surface-treated negative electrode current collector, wherein the surface-treating of the negative electrode current collector by the atmospheric pressure plasma treatment is performed under conditions of a mixed gas including an inert gas and a hydrocarbon gas.

Here, in the surface-treating, the atmospheric pressure plasma treatment may be performed for 0.05 seconds to 1 hour using radio-frequency (RF) power having a frequency of 0.1 MHz to 50 MHz.

Further, the atmospheric pressure plasma treatment may be performed under conditions of a mixed gas of an inert gas and a hydrocarbon gas, and the mixed gas may include the hydrocarbon gas at a partial pressure of 0.1% to 10%.

In addition, the hydrocarbon gas may include one or more of methane ($CH_4$) gas and ethane ($C_2H_6$) gas.

Further, the negative electrode current collector may include any one of stainless steel, copper, nickel, carbon, calcined carbon, titanium, or an aluminum-cadmium alloy.

Advantageous Effects

In a negative electrode for a lithium secondary battery according to the present invention, by controlling a static water contact angle of a surface of a negative electrode current collector and an angle (e.g., a contact angle), which is formed by an end portion of a negative electrode mixture layer and the negative electrode current collector, within a specific range by treating the surface of the negative electrode current collector with atmospheric pressure plasma, the adhesion between the negative electrode current collector and the negative electrode mixture layer can be improved, and also, the induction of a reversal of an N/P ratio between a positive electrode and a negative electrode at an end of an electrode assembly can be prevented and the occurrence of unrolling in the negative electrode mixture layer can be prevented, so that an effect of improving the safety and performance degradation of a lithium secondary battery including the negative electrode is excellent.

BRIEF DESCRIPTION OF THE DRAWINGS

FIG. 1 is an image illustrating a result of measuring a static water contact angle of a negative electrode current collector.

FIG. 2 is an image illustrating a result of measuring a contact angle of a negative electrode slurry with respect to the negative electrode current collector.

BEST MODE

While the present invention is susceptible to various modifications and alternative forms, specific embodiments thereof will herein be described in detail.

It should be understood, however, that there is no intent to limit the present invention to the particular forms disclosed, but on the contrary, the present invention is to cover all modifications, equivalents, and alternatives falling within the spirit and scope of the present invention.

It will be further understood that the terms "comprises," "comprising," "includes," and/or "including," when used herein, specify the presence of stated features, integers, steps, operations, elements, components, and/or groups thereof but do not preclude the presence or addition of one or more other features, integers, steps, operations, elements, components, and/or groups thereof.

Further, when it is stated herein that a portion of a layer, film, area, plate, and the like is "on" another portion, the statement includes the meaning of the portion "being directly on" the other portion in addition to still another portion being interposed therebetween. In contrast, when it is stated that a portion of a layer, film, area, plate, and the like is "below" another portion, the statement includes the meaning of the portion "being directly below" the other portion in addition to still another portion being interposed therebetween. In addition, when it is stated herein that an element is disposed "on" a certain element, it may mean not only that the element is disposed above the certain element but also that the element is disposed below the certain element.

In addition, in the present invention, the term "main component" may mean a case in which the component is included in an amount of 50 wt % or more, 60 wt % or more, 70 wt % or more, 80 wt % or more, 90 wt % or more, 95 wt % or more, or 97.5 wt % or more based on the total weight of a composition or a specific component, and in some cases, may the term "main component" also mean a case in which the component is included in an amount of 100 wt % when the component constitutes the entire composition or specific component.

Further, in the present invention, the term "solid content of a mixture layer" may mean residual components of a negative electrode slurry, from which a solvent is removed, used in manufacturing the mixture layer.

Hereinafter, the present invention will be described in more detail.

Negative Electrode for Lithium Secondary Battery

One embodiment of the present invention provides a negative electrode for a lithium secondary battery including a negative electrode current collector, and a negative electrode mixture layer on at least one surface of the negative electrode current collector wherein the negative electrode mixture layer comprises a negative electrode active material, wherein the negative electrode current collector has a static water contact angle of 60° to 100°.

The negative electrode for a lithium secondary battery according to the present invention has a configuration in which the negative electrode mixture layer including a negative electrode active material is provided on the negative electrode current collector.

In this case, the negative electrode current collector is not particularly limited as long as it has conductivity without causing chemical changes in the battery, and specifically, a negative electrode current collector included of any one of stainless steel, copper, nickel, carbon, calcined carbon, titanium, or an aluminum-cadmium alloy may be used. As an example, the negative electrode current collector may use a copper current collector.

Further, a surface of the negative electrode current collector, on which the negative electrode mixture layer is formed, is surface treated, and thus the negative electrode current collector may exhibit high adhesion to the negative electrode mixture layer while having a low affinity for water. A surface treatment method, such as plasma treatment, electrolytic treatment, or the like, which was conventionally applied to an electrode current collector, was performed for the purpose of improving adhesion to an electrode mixture layer by hydrophilizing a surface of the current collector. However, when the above-described method is applied to the negative electrode current collector for a lithium secondary battery, the adhesion to the negative electrode mixture layer is improved, but a contact angle of an end portion of the negative electrode mixture layer with respect to the negative electrode current collector (e.g., a "sliding angle" of the negative electrode mixture layer) is reduced, and thus an N/P ratio in an end portion of the positive electrode and an end portion of the negative electrode may be reversed. In addition, when the contact angle of the end portion of the negative electrode with respect to the negative electrode current collector is reduced, unrolling may occur at the end portion of the negative electrode mixture layer, which may cause the mixture layer to be deintercalated Accordingly, the present invention may include a structure in which an alkyl group having 1 to 6 carbon atoms is introduced to the at least one surface of the negative electrode current collector by treating the surface of the negative electrode current collector with atmospheric pressure plasma in the presence of a mixed gas of an inert gas and a hydrocarbon gas. In this case, the alkyl group having 1 to 6 carbon atoms may include one or more among a methyl group ($CH_3$—), an ethyl group ($CH_3CH_2$—), an n-propyl group ($CH_3CH_2CH_2$—), and an n-butyl group ($CH_3CH_2CH_2CH_2$—).

As an example, the at least one surface of the negative electrode current collector may be treated with one or more alkyl groups of a methyl group ($CH_3$—) and an ethyl group ($CH_3CH_2$—).

In addition, the alkyl group may be introduced at a predetermined proportion to the surface of the negative electrode current collector, and carbon atoms may be confirmed to be in an amount of 1 at % to 40 at % based on the total atoms when carbon atom mapping is conducted on the negative electrode current collector through field emission scanning electron microscopy (FE-SEM) analysis, and specifically, the carbon atoms may be confirmed to be an amount of 1 at % to 30 at %, 1 at % to 20 at %, 1 at % to 15 at %, 10 at % to 40 at %, 20 at % to 40 at %, 10 at % to 30 at %, 20 at % to 30 at %, 10 at % to 20 at %, or 5 at % to 15 at % based on the total atoms.

In addition, since the alkyl group is introduced to the surface of the negative electrode current collector, a repulsive force against a solvent included in the slurry may be increased during the manufacture of the negative electrode mixture layer, so that, it is possible to realize a large contact angle with the end portion of the negative electrode mixture layer and simultaneously impart high adhesion to the negative electrode mixture layer.

Specifically, in the negative electrode current collector according to the present invention, a predetermined amount of alkyl group is introduced to the surface of the negative electrode current collector, and the repulsive force against the solvent included in the negative electrode slurry is increased, and thus when the negative electrode slurry is applied to the current collector, an angle (that is, a contact angle of the negative electrode slurry with respect to the negative electrode current collector) formed by an end portion of an edge of the applied negative electrode slurry and the negative electrode current collector may be realized to be large. In addition, the contact angle of the negative electrode slurry with respect to the negative electrode current collector may be equal to an angle (e.g., a sliding angle of the negative electrode mixture layer) formed by the negative electrode mixture layer, which is formed by removing only the solvent from the negative electrode slurry, and the negative electrode current collector, and in some cases, the angle may have a variation within ±5%.

As an example, in the negative electrode according to the present invention, the contact angle of the negative electrode slurry with respect to the negative electrode current collector may be 60° or more, and more specifically, 70° or more, 80° or more, 90° or more, 100° or more, in a range of 60° to 100°, in a range of 60° to 80°, in a range of 60° to 75°, in a range of 65° to 95°, in a range of 60° to 95°, in a range of 70° to 99°, in a range of 65° to 89°, in a range of 65° to 84°, or in a range of 65° to 78°.

According to the present invention, unrolling of the negative electrode mixture layer is prevented while an N/P ratio between the positive electrode mixture layer and the negative electrode mixture layer at the end portion may be prevented from being reversed by controlling a static water contact angle of the negative electrode current collector and an angle formed by the end portion of the negative electrode mixture layer formed on the negative electrode current collector, and the negative electrode current collector to satisfy the above-described ranges.

In addition, in the negative electrode current collector according to the present invention, a predetermined amount of alkyl group is introduced to the surface to increase surface energy, so that the static water contact angle of the negative electrode current collector may be adjusted to satisfy the above-described specific range, and also, high adhesion to components constituting the negative electrode mixture layer, for example, the solid content of the mixture layer such as a negative electrode active material, a binder, a conductive agent, and the like may be realized.

As an example, the negative electrode according to the present invention may include the negative electrode current collector having a static water contact angle of 60 to 100°. Specifically, the negative electrode may include the negative electrode current collector having a static water contact angle of 60° to 90°, 60° to 80°, 65° to 95°, 65° to 80°, 60° to 70°, 70° to 80°, or 64° to 79°.

As another example, in the negative electrode according to the present invention, the peel strength of the negative electrode mixture layer with respect to the negative electrode current collector measured according to ASTM D903 may be in a range of 10 gf/cm to 50 gf/cm, and specifically, the peel strength of the negative electrode mixture layer with respect to the negative electrode current collector may be in a range of 10 gf/cm to 40 gf/cm, 10 gf/cm to 30 gf/cm, 10 gf/cm to 20 gf/cm, 20 gf/cm to 50 gf/cm, 30 gf/cm to 50 gf/cm, 20 gf/cm to 40 gf/cm, or 15 gf/cm to 43 gf/cm.

Meanwhile, the negative electrode mixture layer is a layer that includes a negative electrode active material and imparts electrical activity to the battery, and may include the negative electrode active material, a conductive material, a binder, an additive, and the like.

The negative electrode active material may include, for example, a carbon material and a silicon material. The carbon material refers to a carbon material including carbon atoms as a main component, and the carbon material may include graphite having a complete layered crystal structure such as natural graphite, soft carbon having a low-crystalline layered crystal structure (graphene structure in which hexagonal carbon units are arrayed in a honeycomb shaped layer form), hard carbon having a structure in which such structures are mixed with non-crystalline parts, artificial graphite, expanded graphite, carbon fiber, non-graphitized carbon, carbon black, acetylene black, Ketjen black, carbon nanotubes, fullerene, activated carbon, graphene, and the like, and the carbon material may preferably include one or more selected from the group consisting of natural graphite, artificial graphite, graphene, and carbon nanotubes.

Further, as a metal component, the silicon material may include one or more of silicon (Si) particles and silicon oxide (e.g., $SiO_x$, $0.8 \le x \le 2.2$) particles, as particles including silicon (Si) as a main component. As an example, the silicon material may include silicon (Si) particles, silicon monoxide (SiO) particles, silicon dioxide ($SiO_2$) particles, or a mixture thereof.

In addition, the silicon material may have a form in which crystalline particles and amorphous particles are mixed, and a proportion of the amorphous particles may be 50 to 100 parts by weight, and specifically, 50 to 90 parts by weight, 60 to 80 parts by weight, or 85 to 100 parts by weight based on 100 parts by weight of the total silicon material. In the present invention, the proportion of the amorphous particles included in the silicon material is controlled within the above-described range, so that thermal stability and flexibility may be improved in a range that does not degrade electrical properties of the electrode.

Further, the negative electrode active material may include the carbon material and the silicon material, and may be included in an amount of 1 to 20 parts by weight based on 100 parts by weight of the negative electrode mixture layer, and specifically, may be included in an amount of 5 to 20 parts by weight, 3 to 10 parts by weight, 8 to 15 parts by weight, 13 to 18 parts by weight, or 2 to 7 parts by weight, based on 100 parts by weight of the negative electrode mixture layer.

According to the present invention, during initial charging and discharging of the battery, lithium consumption and irreversible capacity loss may be reduced and charge capacity per unit mass may be improved by adjusting the content of the carbon material and the silicon material included in the negative electrode active material within the above-described ranges.

In addition, the binder may include polyvinyl alcohol (PVA), carboxymethylcellulose (CMC), hydroxypropylcellulose, diacetylcellulose, polyvinyl chloride (PVC), carboxylated polyvinylchloride (C-PVC), polyvinylfluoride, ethylene oxide-containing polymer, polyvinyl pyrrolidone, polyurethane (PU), polytetrafluoroethylene (PTFE), polyvinylidene fluoride (PVdF), polyethylene (PE), polypropylene (PP), styrene-butadiene rubber (SBR), acrylated styrene-butadiene rubber, epoxy resin, nylon, and the like. As an example, the binder may use one or more of carboxymethyl cellulose (CMC) and styrene-butadiene rubber (SBR).

In addition, the binder may be included in an amount of 1 to 10 parts by weight, and specifically 2 to 8 parts by weight based on 100 parts by weight of the total negative electrode mixture layer, or the conductive material may be included in an amount of 1 to 5 parts by weight.

In addition, the negative electrode mixture layer may have an average thickness of 100 μm to 200 μm, and specifically, 100 μm to 180 μm, 100 μm to 150 μm, 120 μm to 200 μm, 140 μm to 200 μm, or 140 μm to 160 μm.

Since the negative electrode for a lithium secondary battery according to the present invention has the configuration as described above, the adhesion between the negative electrode current collector and the negative electrode mixture layer may be increased, and the contact angle, which has a trade-off relationship with the adhesion, of the end portion of the mixture layer with respect to the negative electrode current collector may be realized to be large, so that the effect of more excellent battery safety and excellent performance may be exhibited.

Method of Manufacturing Negative Electrode for Lithium Secondary Battery

Further, one embodiment of the present invention provides a method of manufacturing the negative electrode for a lithium secondary battery, the method including:

- surface-treating a negative electrode current collector with atmospheric pressure plasma; and
- forming a negative electrode mixture layer by applying and drying a slurry comprising a negative electrode active material on at least one surface of the surface-treated negative electrode current collector,
- wherein the surface-treating of the negative electrode current collector by the atmospheric pressure plasma treatment is performed under conditions of a mixed gas comprising an inert gas and a hydrocarbon gas.

In the method of manufacturing the negative electrode for a lithium secondary battery according to the present invention, before the slurry for the negative electrode mixture layer is applied on the surface of the negative electrode current collector, surface-treating an area on which the negative electrode slurry is applied with the atmospheric pressure plasma is performed, and then forming the negative electrode mixture layer by applying and drying a negative electrode slurry including the negative electrode active material on the surface-treated area is performed, thereby manufacturing a negative electrode for a lithium secondary battery.

Here, the surface-treating may be performed by treating the entire surface of the negative electrode current collector with atmospheric pressure plasma, or partially treating only an area in which the negative electrode mixture layer is formed with atmospheric pressure plasma. In addition, in the manufacturing method, during the atmospheric pressure plasma treatment, an alkyl group having 1 to 6 carbon atoms may be introduced to the surface of the negative electrode current collector by using a mixed gas including a hydrocarbon gas along with an inert gas.

Specifically, the atmospheric pressure plasma is generated as follows. An alternating electric field is applied between electrodes facing each other, electrons are accelerated to high energy inside a reactor by the electric field, the accelerated electrons collide with gas (e.g., a mixed gas of an inert gas and a hydrocarbon gas) supplied into the reactor and are separated into atomic ions, the separated ions combine with surrounding electrons to form radicals, and the radicals collide with the electrons again and are decomposed into radicals again. The radicals produced by repeating this process are ejected to a surface of a negative electrode current collector to be treated, so that organic matter may be removed, and an alkyl group is bonded to the surface of the current collector to change surface characteristics.

Here, the hydrocarbon gas may be used without limitation as long as it is a gas capable of providing an alkyl group having 1 to 6 carbon atoms, but specifically, methane gas ($CH_4$), ethane gas ($CH_3CH_3$), n-propane gas ($CH_3CH_2CH_3$), n-butane gas ($CH_3CH_2CH_2CH_3$), and the like may be used.

Further, accordingly, the alkyl group having 1 to 6 carbon atoms may be introduced to the surface of the surface-treated negative electrode current collector, and the alkyl group having 1 to 6 carbon atoms may include one or more among a methyl group ($CH_3$—), an ethyl group ($CH_3CH_2$), an n-propyl group ($CH_3CH_2CH_2$—), and an n-butyl group ($CH_3CH_2CH_2CH_2$—).

As an example, during the atmospheric pressure plasma treatment, the negative electrode current collector may be surface-treated with one or more alkyl groups of methyl group ($CH_3$—) and ethyl group ($CH_3CH_2$—) using one or more gases of methane gas ($CH_4$) and ethane gas ($CH_3CH_3$).

According to the present invention, by limiting types of the alkyl group, which is introduced to the surface of the negative electrode current collector, as described above, the hydrophobicity of the surface of the current collector may be prevented from significantly increasing due to an increase in the chain length of the hydrocarbon.

In addition, a predetermined proportion of alkyl group may be introduced to the surface of the negative electrode current collector, and to this end, when the atmospheric pressure plasma treatment is performed, a partial pressure of the hydrocarbon gas included in the mixed gas, a flow rate of the mixed gas, a frequency condition of a power supply, and the like may be controlled within a specific range.

Specifically, in the method of manufacturing the negative electrode for a lithium secondary battery according to the present invention, during the atmospheric pressure plasma treatment, the partial pressure of the hydrocarbon gas included in the mixed gas may be adjusted to 0.1% to 10%, and more specifically, the partial pressure of the hydrocarbon gas may be adjusted to 0.1% to 8%, 0.1% to 5%, 0.1% to 3%, 0.5% to 5%, 1% to 7%, 5% to 9%, 3% to 7%, 2% to 8%, or 1% to 5%.

As an example, in the method of manufacturing the negative electrode for a lithium secondary battery according to the present invention, as the mixed gas during the atmospheric pressure plasma treatment, a gas in which an inert gas and a hydrocarbon gas are mixed may be used, and a partial pressure of the hydrocarbon gas may be 3% to 5% of that of the total gas.

In addition, in the atmospheric pressure plasma treatment, the above-described mixed gas is input at a flow rate of 0.1 L/min to 40 L/min, and preferably, at a flow rate of 1 L/min to 10 L/min. When the flow rate is less than 0.1 L/min, there is a problem in that a process time increases, and when the flow rate exceeds 40 L/min, there is a problem in that stability is reduced.

In addition, the atmospheric pressure plasma treatment may be performed for 0.05 seconds to 1 hour using radio-frequency (RF) power having a frequency of 0.1 MHz to 50 MHz. Specifically, the atmospheric pressure plasma treatment may be performed for 0.05 seconds to 30 minutes, 0.05 seconds to 20 minutes, 0.05 seconds to 10 minutes, 0.05 seconds to 5 minutes, 0.05 seconds to 1 minute, 0.05 seconds to 10 seconds, or 0.05 seconds to 2 seconds using RF power having a frequency of 0.1 MHz to 20 MHz, 0.1 MHz to 10 MHz, 1 MHz to 50 MHz, 5 MHz to 30 MHz, 10 MHz to 30 MHz, 20 MHz to 40 MHz, or 1 MHz to 10 MHz.

Meanwhile, the negative electrode current collector is not particularly limited as long as it has conductivity without causing chemical changes in the battery, and specifically, a negative electrode current collector included of any one of stainless steel, copper, nickel, carbon, calcined carbon, titanium, or an aluminum-cadmium alloy may be used. As an example, the negative electrode current collector may use a copper current collector.

Modes of the Invention

Hereinafter, the present invention will be described in more detail by Examples and Experimental Example.

However, Examples and Experimental Example described below are for exemplifying the present invention, and the contents of the present invention are not limited to thereto.

Examples 1 to 3 and Comparative Examples 1 to 7. Manufacture of Negative Electrode for Lithium Secondary Battery The entire surface of a copper (Cu) current collector provided through a transfer path was treated with atmospheric pressure plasma formed using RF power for 0.05 to 1 second. At this time, in the atmospheric pressure plasma treatment, a mixed gas was supplied at a flow rate of 5±0.1 L/min, and the composition and partial pressure of the mixed gas and the frequency of the RF power were adjusted as shown in Table 1 below.

Further, carbon atom mapping was performed on each surface-treated negative electrode current collector through an FE-SEM analysis to measure a proportion of carbon atoms to the total atoms of the surface of the negative electrode current collector, and the results are shown in Table 1 below.

Thereafter, a negative electrode slurry (solvent: water) including 83 wt % of graphite and 15 wt % of silicon oxide ($SiO_2$) as a negative electrode active material (based on solid content) and 2 wt % of SBR as a binder was applied to the surface of the atmospheric pressure plasma-treated copper current collector, dried at 100 ° C., and then rolled to manufacture a negative electrode for a lithium secondary battery. Here, it was confirmed whether an end portion of the negative electrode mixture layer was unrolled due to a small angle between the end portion of the negative electrode mixture layer and the negative electrode current collector when the negative electrode mixture layer was rolled, and the results are shown in Table 1 below.

TABLE 1

| | Mixed gas | | | Proportion of carbon elements | Rolling of negative |
|---|---|---|---|---|---|
| | Composition | Partial pressure [%] | RF power frequency [MHz] | during FE-SEM analysis [At %] | electrode mixture layer |
| Example 1 | Ar and $CH_4$ | $Ar:CH_4$ = 99:1 | 8 ± 0.5 | 12 ± 0.5 | ○ |
| Example 2 | Ar and $CH_4$ | $Ar:CH_4$ = 96:4 | 8 ± 0.5 | 21 ± 0.5 | ○ |
| Example 3 | Ar and $CH_4$ | $Ar:CH_4$ = 91:9 | 8 ± 0.5 | 28 ± 0.5 | ○ |
| Comparative Example 1 | Ar | Ar = 100 | 8 ± 0.5 | 0 | X |
| Comparative Example 2 | Ar and $CF_4$ | $Ar:CF_4$ = 96:4 | 8 ± 0.5 | 21 ± 0.5 | ○ |
| Comparative Example 3 | Ar and $O_2$ | $Ar:O_2$ = 96:4 | 8 ± 0.5 | 0 | X |
| Comparative Example 4 | Ar and $CH_4$ | $Ar:CH_4$ = 99.99:0.01 | 8 ± 0.5 | 0.8 ± 0.01 | ○ |
| Comparative Example 5 | Ar and $CH_4$ | $Ar:CH_4$ = 80:20 | 8 ± 0.5 | 63 ± 0.5 | ○ |
| Comparative Example 6 | Ar and $CH_4$ | $Ar:CH_4$ = 96:4 | 0.01 | 4 ± 0.02 | X |
| Comparative Example 7 | Ar and $CH_4$ | $Ar:CH_4$ = 96:4 | 60 ± 0.5 | 47 ± 0.5 | ○ |

Experimental Example

In order to evaluate the negative electrode for a lithium secondary battery according to the present invention, the following experiments were carried out.

A) Measurement of Static Water Contact Angle of Negative Electrode Current Collector The surface of the negative electrode current collector was subjected to atmospheric pressure plasma treatment in the same manner as in Examples 1 to 3 and Comparative Examples 1 to 7. Static water contact angle (static WCA) measurement was carried out on each atmospheric pressure plasma-treated negative electrode current collector using a contact angle measurement device (model name: SmartDrop, manufactured by Femtofab Co. Ltd). At this time, each measurement was carried out by dropping a 10 μl drop of water or oil on the surface for each measurement, and repeated three times to derive an average value thereof, and the results are shown in FIG. 1 and Table 2 below.

B) Measurement of Contact Angle of Negative Electrode Slurry with Respect to Negative Electrode Current Collector The surface of the negative electrode current collector was subjected to atmospheric pressure plasma treatment in the same manner as in Examples 1 to 3 and Comparative Examples 1 to 7. Thereafter, three drops of negative electrode slurry were dropped on the surface of each atmospheric pressure plasma-treated negative electrode current collector, and an angle (i.e., contact angle) formed by the negative electrode slurry having droplets formed on a surface thereof and the negative electrode current collector was measured using a contact angle measurement device (model name: SmartDrop, manufactured by Femtofab Co. Ltd).

At this time, the negative electrode slurry included 83% by weight of graphite and 15% by weight of silicon oxide ($SiO_2$) as a negative electrode active material (based on solid content), and 2% by weight of SBR as a binder, and water as a solvent was mixed in an amount of 10% by weight based on the weight of the total solid content. The measured results are shown in FIG. 2 and Table 2 below.

C) Measurement of Adhesion Between Negative Electrode Current Collector and Negative Electrode Mixture Layer 180° peel strength of the negative electrode mixture layer was measured according to ASTM D903 for the negative electrodes manufactured in Examples 1 to 3 and Comparative Examples 1 to 7, and the results are shown in Table 2 below.

TABLE 2

| | Static water contact angle [°] | Contact angle of negative electrode slurry [°] | Adhesion between current collector and mixture layer [gf/cm] |
|---|---|---|---|
| Example 1 | 69 | 63 | 13 |
| Example 2 | 76 | 71 | 21 |
| Example 3 | 83 | 80 | 38 |
| Comparative Example 1 | 35 | 36 | 91 |
| Comparative Example 2 | 141 | 122 | 2.7 |
| Comparative Example 3 | 15 | 14 | 73 |
| Comparative Example 4 | 49 | 47 | 61 |
| Comparative Example 5 | 110 | 103 | 9 |
| Comparative Example 6 | 59 | 47 | 56 |
| Comparative Example 7 | 107 | 104 | 5 |

It can be seen that, as shown in FIGS. 1 and 2 and Table 2, in the negative electrode for a lithium secondary battery according to the present invention, the adhesion between the negative electrode current collector and the negative electrode mixture layer is excellent, and the contact angle of the end portion of the negative electrode mixture layer with respect to the negative electrode current collector is large.

Specifically, the negative electrodes for a lithium secondary battery of Examples show a static water contact angle of 66 to 95°, and a contact angle formed by the end portion of the negative electrode mixture layer and the negative electrode current collector of 60 to 90°. This means that an alkyl group is introduced at a predetermined proportion (specifically, a predetermined atomic proportion) to the surface of the negative electrode current collector, and thus, a repulsive force against the solvent, specifically, water, included in the negative electrode slurry is induced when the negative electrode mixture layer is manufactured, so that the contact angle between the negative electrode current collector and the end portion of the negative electrode mixture layer is realized to be large.

Further, in the negative electrodes for a lithium secondary battery of Examples, it was confirmed that peel strength of the negative electrode current collector and the negative electrode mixture layer is in a range of 10 gf/cm to 40 gf/cm. This means that the adhesion between the negative electrode current collector and the negative electrode mixture layer is improved.

With these results, it can be seen that, in the negative electrode for a lithium secondary battery according to the present invention, a static water contact angle of the surface of the negative electrode current collector and an angle (e.g., contact angle) formed by the end portion of the negative electrode mixture layer and the negative electrode current collector may be controlled within a specific range by treating the surface of the negative electrode current collector with atmospheric pressure plasma, so that, the adhesion between the negative electrode current collector and the negative electrode mixture layer may be improved, and the induction of a reversal of an N/P ratio of a positive electrode and a negative electrode and the occurrence of unrolling in the negative electrode mixture layer may be prevented.

While the present invention has been described with reference to the exemplary embodiments thereof, it will be understood by those skilled in the art that various changes in form and details may be made therein without departing from the spirit and technical scope of the present invention as defined by the appended claims.

Therefore, the technical scope of the present invention should not be limited to the content described in the detailed description of the specification but should be determined by the scope of the appended claims.

The invention claimed is:

1. A negative electrode for a lithium secondary battery, the negative electrode comprising:

a negative electrode current collector; and a negative electrode mixture layer on at least one surface of the negative electrode current collector wherein the negative electrode mixture layer comprises a negative electrode active material, wherein the surface of the negative electrode current collector on which the negative electrode mixture layer is provided has a static water contact angle of 60° to 100 °, wherein an angle formed by an end portion of the negative electrode mixture layer and the negative electrode current collector is 60° or more, wherein the at least one surface of the negative electrode current collector is surface-treated with an alkyl group having 1 to 6 carbon atoms, and wherein the alkyl group is introduced to the at least one surface of the negative electrode current collector by atmospheric pressure plasma treatment performed under conditions of a mixed gas comprising an inert gas and a hydrocarbon gas.

2. The negative electrode of claim 1, wherein in the negative electrode, a peel strength of the negative electrode mixture layer with respect to the negative electrode current collector according to ASTM D903 is in a range of 10 gf/cm to 50 gf/cm.

* * * * *